United States Patent
Chen et al.

(10) Patent No.: US 11,871,323 B2
(45) Date of Patent: Jan. 9, 2024

(54) VEHICLE AND INFORMATION INTERACTION SYSTEM THEREOF

(71) Applicant: Zhejiang CFMOTO Power Co., Ltd., Zhejiang (CN)

(72) Inventors: Zhiyong Chen, Hangzhou (CN); Maolin Wei, Hangzhou (CN); Daoyong Zhan, Hangzhou (CN)

(73) Assignee: Zhejiang CFMOTO Power Co. Ltd., Zhejiang (CN)

( * ) Notice: Subject to any disclaimer, the term of this patent is extended or adjusted under 35 U.S.C. 154(b) by 0 days.

(21) Appl. No.: 17/831,352

(22) Filed: Jun. 2, 2022

(65) Prior Publication Data

US 2023/0353998 A1    Nov. 2, 2023

(30) Foreign Application Priority Data

Jun. 7, 2021 (CN) ............................ 202110634412
Jul. 23, 2021 (CN) ......................... 202110835214.0

(51) Int. Cl.
*H04W 4/80* (2018.01)
*H04W 4/48* (2018.01)

(52) U.S. Cl.
CPC ............... *H04W 4/80* (2018.02); *H04W 4/48* (2018.02)

(58) Field of Classification Search
CPC .................................................... H04W 4/80
See application file for complete search history.

(56) References Cited

U.S. PATENT DOCUMENTS

| | | | |
|---|---|---|---|
| 6,876,845 B1* | 4/2005 | Tabata ................... | H04B 1/385 455/344 |
| 6,922,545 B2* | 7/2005 | Nakatsugawa ........ | H04B 7/155 455/500 |
| 7,317,936 B2 | 1/2008 | Katayama et al. | |
| 2003/0032460 A1* | 2/2003 | Cannon ............... | H04M 1/6091 455/569.2 |
| 2003/0220131 A1* | 11/2003 | Katayama ............ | H01Q 1/3283 455/95 |
| 2006/0293092 A1* | 12/2006 | Yard ....................... | A42B 3/30 455/575.2 |

(Continued)

FOREIGN PATENT DOCUMENTS

| | | |
|---|---|---|
| CN | 106130585 A | 12/2016 |
| CN | 110546958 A | 12/2019 |

*Primary Examiner* — David Bilodeau
(74) *Attorney, Agent, or Firm* — Shewchuk IP Services, LLC; Jeffrey D. Shewchuk

(57) ABSTRACT

A centralized control system in an information interaction system has a communication module capable of transmitting audio signals such as by Bluetooth with a first and a second wearable device. When a user of the first wearable device is on a driver's seat and a user of the second wearable device is on a passenger's seat of a vehicle the centralized control system is capable of transmitting audio signals for the driver and passenger to speak to each other. The information interaction system can include a display screen and/or button for connecting, or rejecting incoming, calls through a mobile terminal. The information interaction system can also have voice command recognition functions, such as to control certain equipment of the vehicle or to make and answer queries through the mobile terminal.

20 Claims, 8 Drawing Sheets

(56) References Cited

U.S. PATENT DOCUMENTS

| | | | |
|---|---|---|---|
| 2014/0335902 A1* | 11/2014 | Guba | H04W 4/027 |
| | | | 381/86 |
| 2018/0007994 A1* | 1/2018 | Boesen | A42B 3/30 |
| 2018/0009447 A1* | 1/2018 | Boesen | B62J 3/14 |
| 2019/0053021 A1* | 2/2019 | Fuke | E05B 83/36 |
| 2021/0114616 A1 | 4/2021 | Altman et al. | |
| 2021/0329430 A1* | 10/2021 | Stafford | G10K 11/17823 |
| 2022/0159367 A1* | 5/2022 | Yamkovoy | G10K 11/1783 |

* cited by examiner

VEHICLE AND INFORMATION INTERACTION SYSTEM THEREOF

RELATED APPLICATION INFORMATION

The present application claims the benefits of priority to Chinese Patent Applications No. 202110634412.0, filed with the Chinese Patent Office on Jun. 7, 2021 and No. 202110835214.0, filed with the Chinese Patent Office on Jul. 23, 2021. The entire contents of the above-referenced applications are incorporated herein by reference.

FIELD OF THE DISCLOSURE

The present application relates to vehicles, and in particular to a vehicle and an information interaction system thereof.

BACKGROUND OF THE DISCLOSURE

Motorcycles are a commonly used means of transportation. Motorcycles have advantages over cars of smaller size and weight, making it easier to maneuver through traffic and fit into flexible and convenient locations. In recent years, it has become a fashionable leisure activity to travel or explore by motorcycle. Some people who enjoy outdoor activities choose to travel with friends, for example, riding a motorcycle with a passenger's seat or an all-terrain vehicle (ATV) for traveling together. However, the closed helmet and the noise during the riding process may result in certain obstacles in the communication between the driver on the driver's seat and the passenger on the passenger's seat. If the driver and passenger communicate with each other by stopping the vehicle or taking off the helmets frequently, both travel time and safety hazards are increased. Similar problems exist between the driver and passenger on some outdoor touring or adventure ATVs.

In related art, to solve the problem of communication between the driver on the driver's seat and the passenger on the passenger's seat when the motorcycle or the all-terrain vehicle is running, customized transmission devices may be provided at the driver's and the passenger's seats respectively, so that the driver and passenger are able to communicate with each other through direct interaction of two customized transmission devices or mobile communication networks. However, the need to use customized transmission devices leads to a high equipment cost. Rather than using customized transmission devices, the driver and the passenger may communicate with each other using mobile phones, including by installing third-party software such as WeChat on the mobile phones. In some systems, headsets of the driver and the passenger may be respectively connected to the mobile phones equipped with WeChat software. The mobile network based on mobile phones enables the communication between the driver and the passenger through the audio function of WeChat software. Alternatively, the driver and the passenger may use the connecting and calling function of the mobile phone to communicate with each other. However, during travel or adventure, vehicles often enter remote areas. The mobile network and signals of the mobile phone are often weak or not covered in some remote areas, so the communication using mobile phones is not stable, and the communication between the driver and the passenger is easily interrupted and unstable. In addition, the driver and the passenger may need to physically manipulate or press buttons on their mobile phones to communicate whether using connecting and calling function of the mobile phone or audio function of the third-party software, which leads to inconvenience and potentially dangerous situations in the running of motorcycles or ATVs.

SUMMARY OF THE INVENTION

The present invention involves a vehicle and an information interaction system thereof which allows communication between the driver and the passenger during the running of the vehicle. The system is low cost, is not affected by the mobile communication network coverage, and is easy to operate.

In one aspect, a centralized control system includes a control unit and a display screen, with the display screen centered in-line with the driver's seat close to the handlebar assembly. The control unit is used to control the display screen to display the status information of the vehicle, and includes at least one communication module capable of transmitting signals with a first wearable device and a second wearable device. The first and second wearable devices can each include headsets with microphones and speakers. When a driver is wearing the first wearable device and driving, and when a passenger is wearing the second wearable device and riding, the centralized control system is capable of transmitting two-way audio signals between the driver and passenger. The communication module of the centralized control system may be connected to the first wearable device and the second wearable device through short distance wireless communication; wherein the short distance wireless communication includes one of the following: Bluetooth communication, ZigBee communication, Wi-Fi communication, UWB communication, Radio frequency communication, and Infrared communication.

The preferred centralized control system is capable of transmitting local audio signals of a mobile terminal and the audio signals acquired by the mobile terminal from a cloud server to the first wearable device and the second wearable device when the centralized control system is connected to the mobile terminal. In some embodiments, one of the first wearable device and the second wearable device is set as a master device by the centralized control system. The centralized control system is capable of transmitting audio signals of a telephone call only to the master device when the audio signals of the call output from the mobile terminal are received by the centralized control system, and is capable of transmitting the audio signals acquired by the master device only to the mobile terminal for the duration of the call.

In some embodiments, at the initiation of an incoming telephone call, the centralized control system is capable of recognizing command words spoken into the master device so as to determine whether to connect or reject the call, and is capable of transmitting the instruction result to the mobile terminal. Alternatively or in addition, at the initiation of an incoming telephone call, the display screen is capable of displaying trigger areas for connecting and rejecting the call of the mobile terminal. The control unit is capable of determining and having the mobile terminal carry out the instruction result for connecting or rejecting the call according to the trigger instruction of the trigger area.

Alternatively or in addition, the handlebar assembly can be provided with one or more buttons connected to the centralized control system. At the initiation of a telephone call, the button(s) is (are) capable of transmitting a control command to the centralized control system in response to an external force to connect or reject the call, and the control unit is capable of determining the instruction result and have the mobile terminal carry out the instruction result.

In some embodiments, the centralized control system is capable of analyzing audio signals acquired by the master device for preset wake and command terms. When the audio signals acquired by the master device are matched with the preset voice signals, the centralized control system is capable of recognizing the audio signals acquired by the master device to determine the audio intention, and is capable of controlling the vehicle according to the audio intention, or the centralized control system is capable of obtaining a query result corresponding to the audio intention from a cloud server according to the audio intention, and is capable of converting the query result into audio signals of the query result and is capable of transmitting the audio signals of the query result to the master device.

The invention can be carried out either as part of a complete vehicle (motorcycle or all-terrain vehicle), or as an information interaction system for such a vehicle.

For better understanding of other features, objects and advantages of the invention, the details of one or more embodiments of the present invention are set forth in the drawings and the description below.

BRIEF DESCRIPTION OF THE DRAWINGS

The drawings described herein are used to provide better understanding of the present invention, in which.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

For a better understanding of the purpose, technical solutions and advantages of the present invention, a preferred embodiment of the present invention is described and illustrated below.

Unless otherwise defined, the technical or scientific terms involved in this specification shall have the general meaning understood by a person with ordinary skill in the technical field to which this invention belongs. As used in this specification, the terms "a", "an", "the", "these", and the like do not denote quantitative limitations, and they may be singular or plural. As used in this specification, the terms "comprising", "including", "having" and any variations thereof are intended to cover non-exclusive inclusion; for example, a process, method, system, product or device including a series of steps or modules (units) are not limited to only the listed steps or modules (units), but may include unlisted steps or modules (units), or may include other steps or modules (units) inherent to these processes, methods, products or devices. As used in this specification, the terms "connected to", "linked to" "coupled to" and the like are not limited to physical or mechanical connections, but may include electrical connections, whether directly or indirectly. As used in this specification, the term "a plurality of" refers to two or more. The term "and/or" describes the relationship between associated objects, indicating that there may be three kinds of relationships, for example, "A and/or B" means A and B, A alone, and B alone. Normally, the character "I" indicates that the objects associated with each other are an "or" relationship. As used in this specification, the terms "first", "second", "third" and the like are only for distinguishing similar objects, and do not represent a specific order for the objects. As used in this specification, the term "transmission device" is an intermediate device that transmits the power of the power system to the wheels, for example a gearbox.

Figure 1:
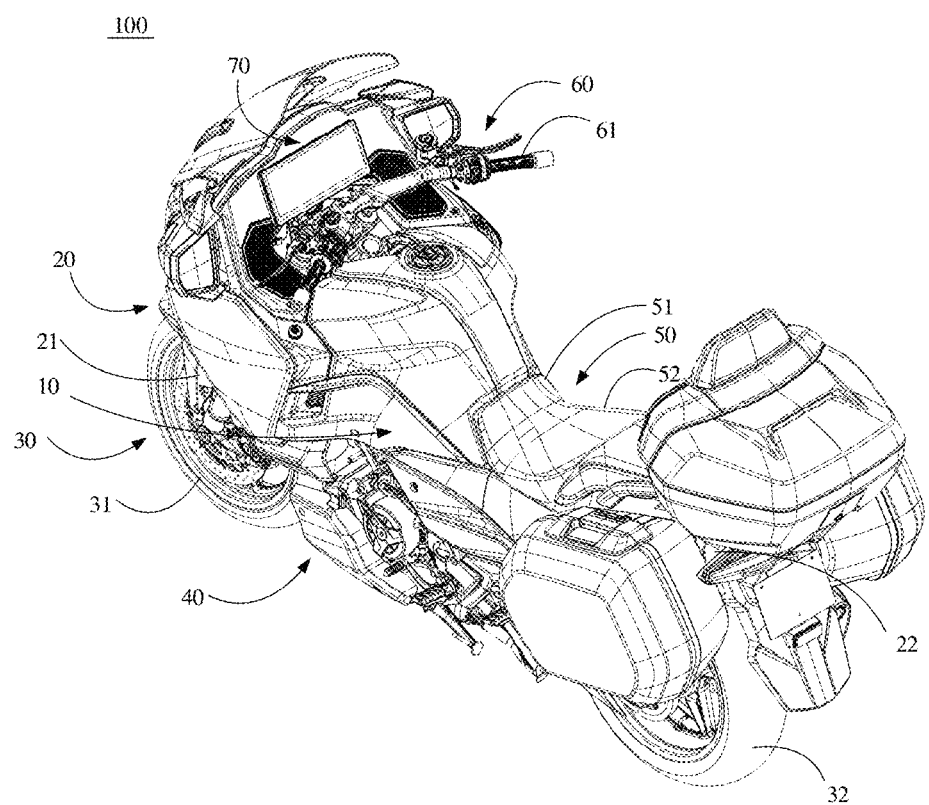
FIG. 1 is a vehicle according to an embodiment of the invention.

In one embodiment of the present invention, a vehicle is provided, and the vehicle is a motorcycle or an all-terrain vehicle. FIG. 1 shows a vehicle 100 according to an embodiment of the invention. As shown in FIG. 1, the vehicle 100 can be a motorcycle which includes a frame 10, a suspension system 20, wheels 30, a power system 40, a seating area 50, a manipulation system 60 and a centralized control system 70.

The wheel 30 includes a front wheel 31 and a rear wheel 32, and the suspension system 20 includes a front suspension 21 and a rear suspension 22. The front wheel 31 is connected to the frame 10 through the front suspension 21, and the rear wheel 32 is connected to the frame 10 through the rear suspension 22. A power system 40 for providing power for the running of the motorcycle is disposed on the frame 10. At least one of the front wheel 31 and the rear wheel 32 is connected to the power system 40 in a transmission mode.

The seats 50 are disposed on the frame 10 and include a driver's seat 51 and at least one passenger's seat 52. The seats 51, 52 may be saddles or other types which meet the riding purpose of the driver and passenger.

The manipulation system 60 for manipulating the running of the vehicle is electrically connected to the power system 40. The manipulation system 60 includes a handlebar assembly 61 located above the front wheel 31 and in front of the driver's seat 51.

Figure 2:
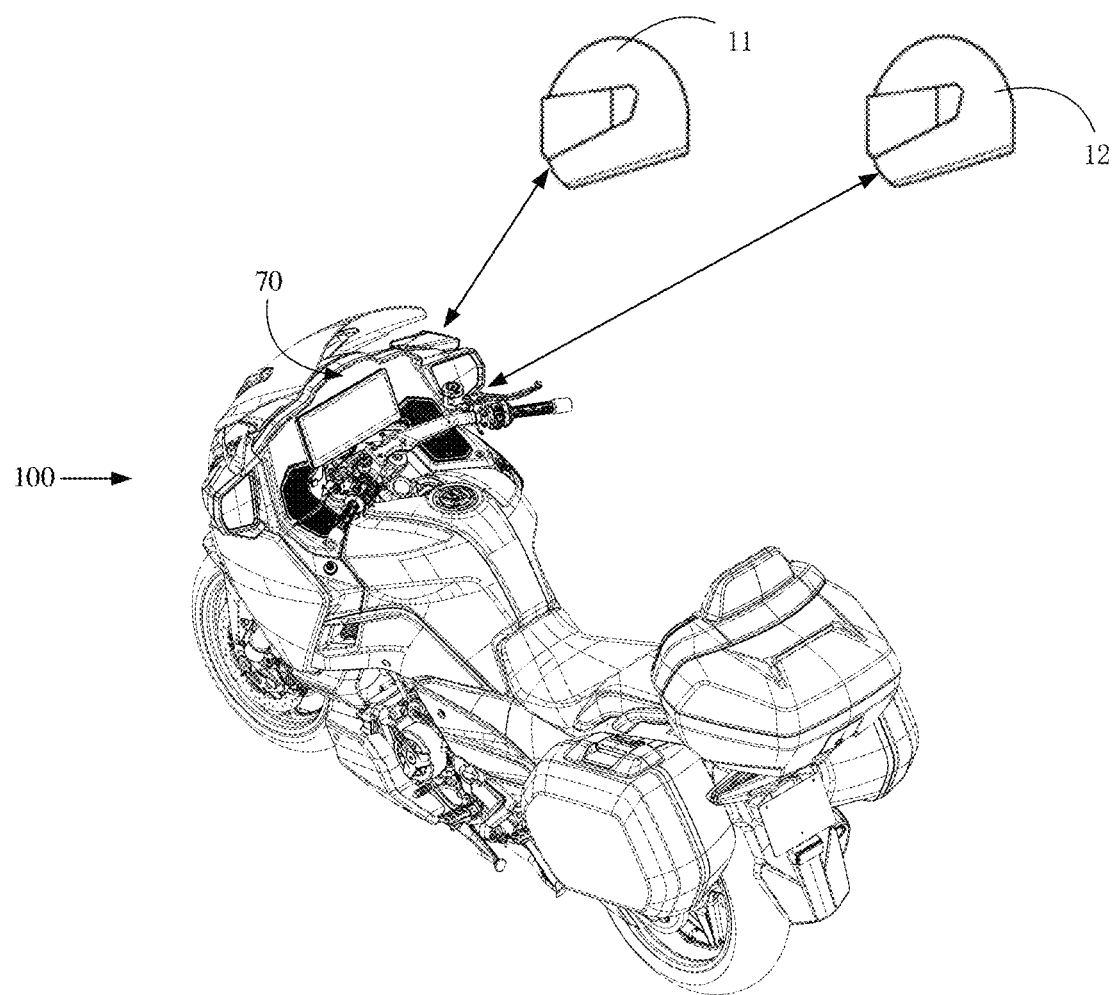
FIG. 2 is a schematic diagram of the interaction between the vehicle and a first wearable device and a second wearable device according to an embodiment of the invention.
Figure 3:
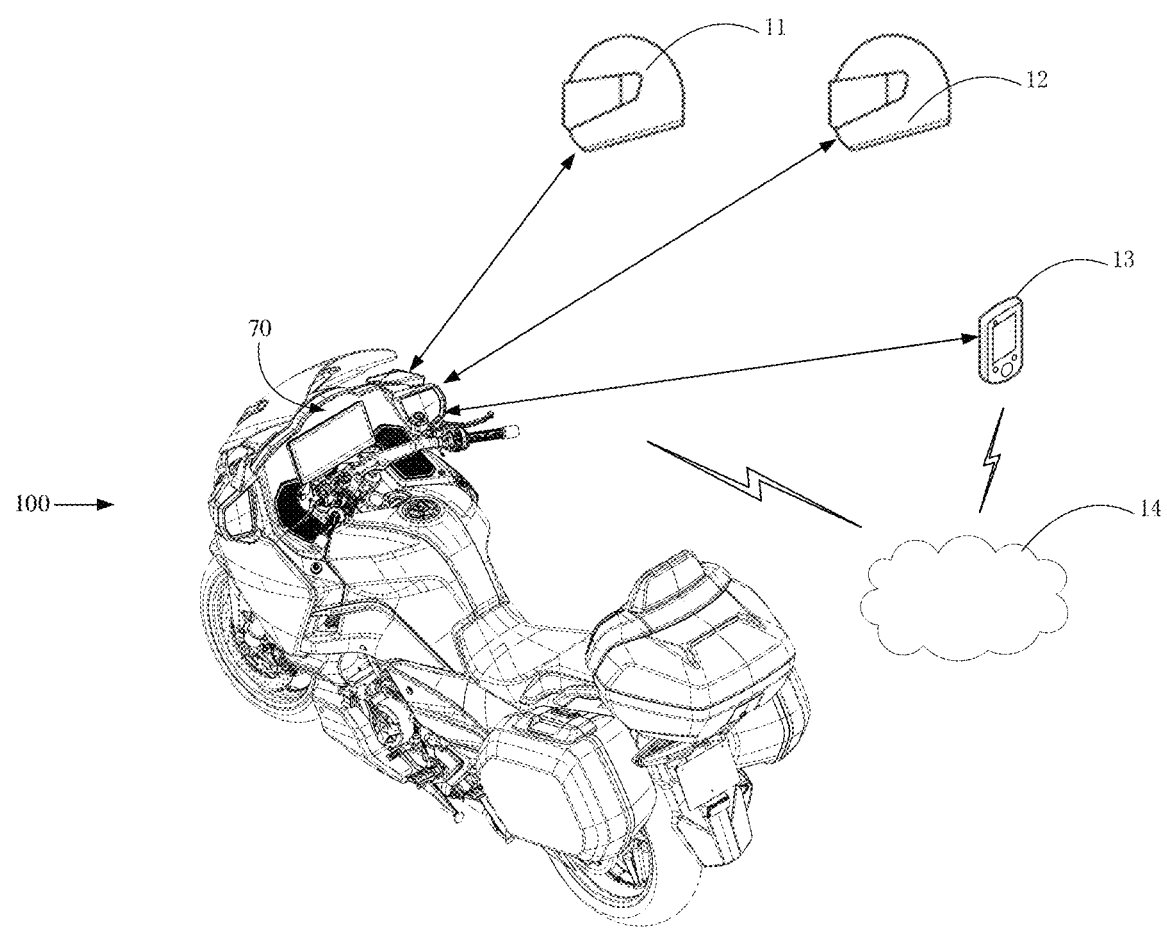
FIG. 3 is a schematic diagram of the interaction between the vehicle and an external device according to an embodiment of the invention.
Figure 6:
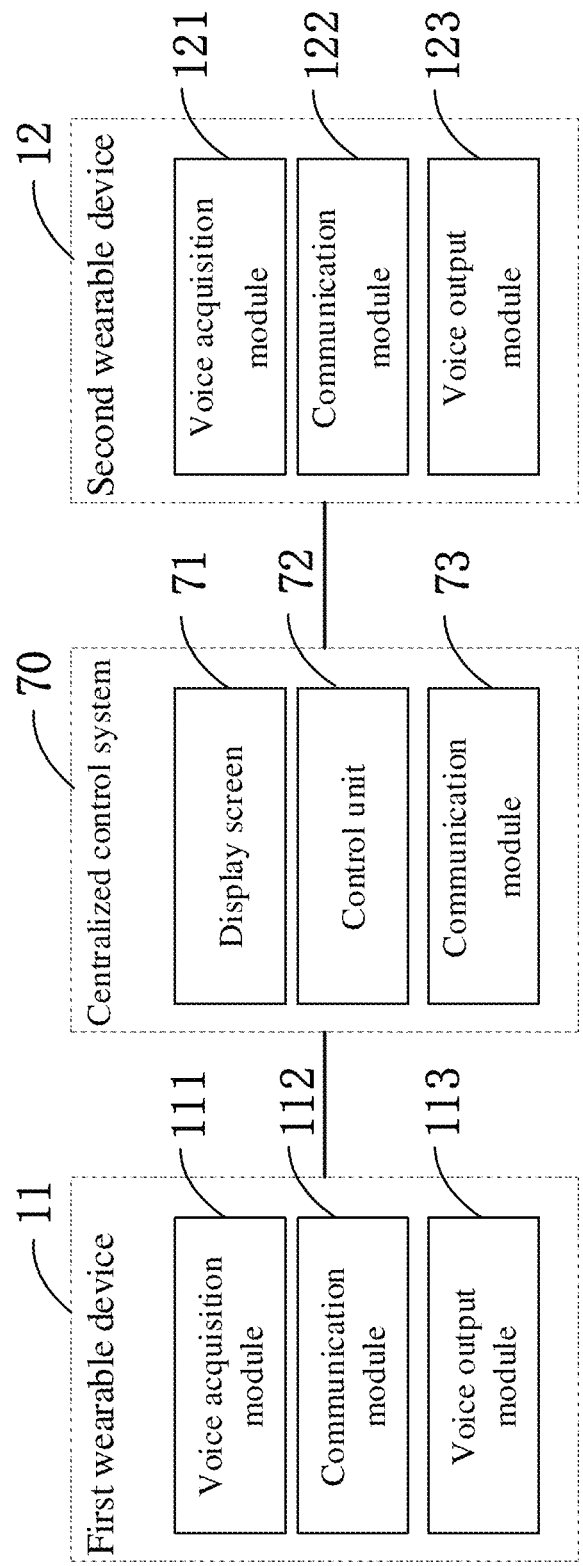
FIG. 6 is a block diagram of structures of an information interaction system according to an embodiment of the invention.

As shown in FIG. 6, the centralized control system 70 includes a control unit 72 and a display screen 71. The display screen 71 is preferably centrally located in front of the driver's seat 51, close to the handlebar assembly 61. The control unit 72 is used to control the display screen 71 to display images. The centralized control system 70 includes at least one communication module 73. As shown in FIGS. 2 and 3, the centralized control system 70 is capable of transmitting signals with a first wearable device 11 and a second wearable device 12 through the communication module 73. When a user of the first wearable device 11 is located on the driver's seat 51 and a user of the second wearable device 12 is located on the passenger's seat 52, the centralized control system 70 is capable of transmitting audio signals acquired by the first wearable device 11 to the second wearable device 12 through the communication module 73 and the centralized control system 70 is also capable of transmitting audio signals acquired by the second wearable device 12 to the first wearable device 11 through the communication module 73, so that the user of the first wearable device 11 and the user of the second wearable device 12 are able to speak with and hear each other. It will be understood that the audio signals will have different carriers in different transmission stages (for example, a first carrier may be air pressure waves of the driver's voice acquired by the first wearable device 11, a second carrier may be electro-magnetic wave signals corresponding to the driver's voice transmitted through the air by the first wearable device 11 to the centralized control system 70, a third carrier may be electrical signals corresponding to the driver's voice transmitted by wires within the centralized control system 70, etc.). The second wearable device 12 may be worn by a passenger seated on the passenger's seat 52, or may be worn by a passenger or a driver in another vehicle within a certain distance from the vehicle 100. The first wearable device 11 and the second wearable device 12 may be may be headsets, or more preferably headsets built into helmets.

The communication between the wearable devices 11, 12 and the centralized control system 70 may be via Bluetooth or other short-distance wireless communication, such as through in-ear Bluetooth headsets, ear-hook Bluetooth headsets, or sports Bluetooth headsets. One preferred Bluetooth module is a model GOC-BE470 Bluetooth module available from Shenzhen Goodocom information technology co. LTD.

Alternatively, either or both of the first wearable device 11 and the second wearable device 12 may be connected to the centralized control system 70 through audio connecting cords, (such as for wired headsets). Compared to connection via audio connecting cords, short distance wireless communication avoids any problem of accidental loosening or breaking of cords during running. Compared to customized transmission devices (such as customized headsets with talk-back functionality, where the talk-back function needs to be modulated for matching frequency before communication), the technical scheme of the present the invention is based on the centralized control system 70 of the vehicle 100 without the need for a customized transmission device thereby reducing cost. Compared to using connecting and calling functions of mobile phones and/or audio function of third-party software, the present invention does not need to rely on a longer distance mobile network, and solves the problem of frequent interruption and instability of communication between the driver and the passenger, and does not require the driver and the passenger to call by controlling their own mobile phones.

Other potential types of short distance wireless communication with the centralized control system 70 include ZigBee communication, Wi-Fi communication, ultra-wideband communication (UWB), 60 GHZ communication, Infrared communication, RFID (radio frequency identification) communication, near field communication, VLC (visible light) communication, dedicated short-range communication, LTE-V communication or the like.

FIG. 3 is a schematic diagram of the interaction between a vehicle and an external device according to an embodiment of the invention. As shown in FIG. 3, the external devices may include a first wearable device 11, a second wearable device 12, a mobile terminal 13 and a cloud server 14. The centralized control system 70 includes at least two Bluetooth modules, so as to be able to connect to the Bluetooth module of the first wearable device 11, the Bluetooth module of the second wearable device 12, and the Bluetooth module of the mobile terminal 13. Further, the centralized control system 70 is capable of transmitting local audio signals of the mobile terminal 13 and the audio signals acquired by the mobile terminal 13 from a cloud server 14 to the first wearable device 11 and the second wearable device 12 when the centralized control system 70 is connected to the mobile terminal 13. It should be noted that the centralized control system 70 may also be directly connected to the cloud server 14 to transmit the audio signals acquired from the cloud server 14 to the first wearable device 11 and the second wearable device 12.

Figure 4:
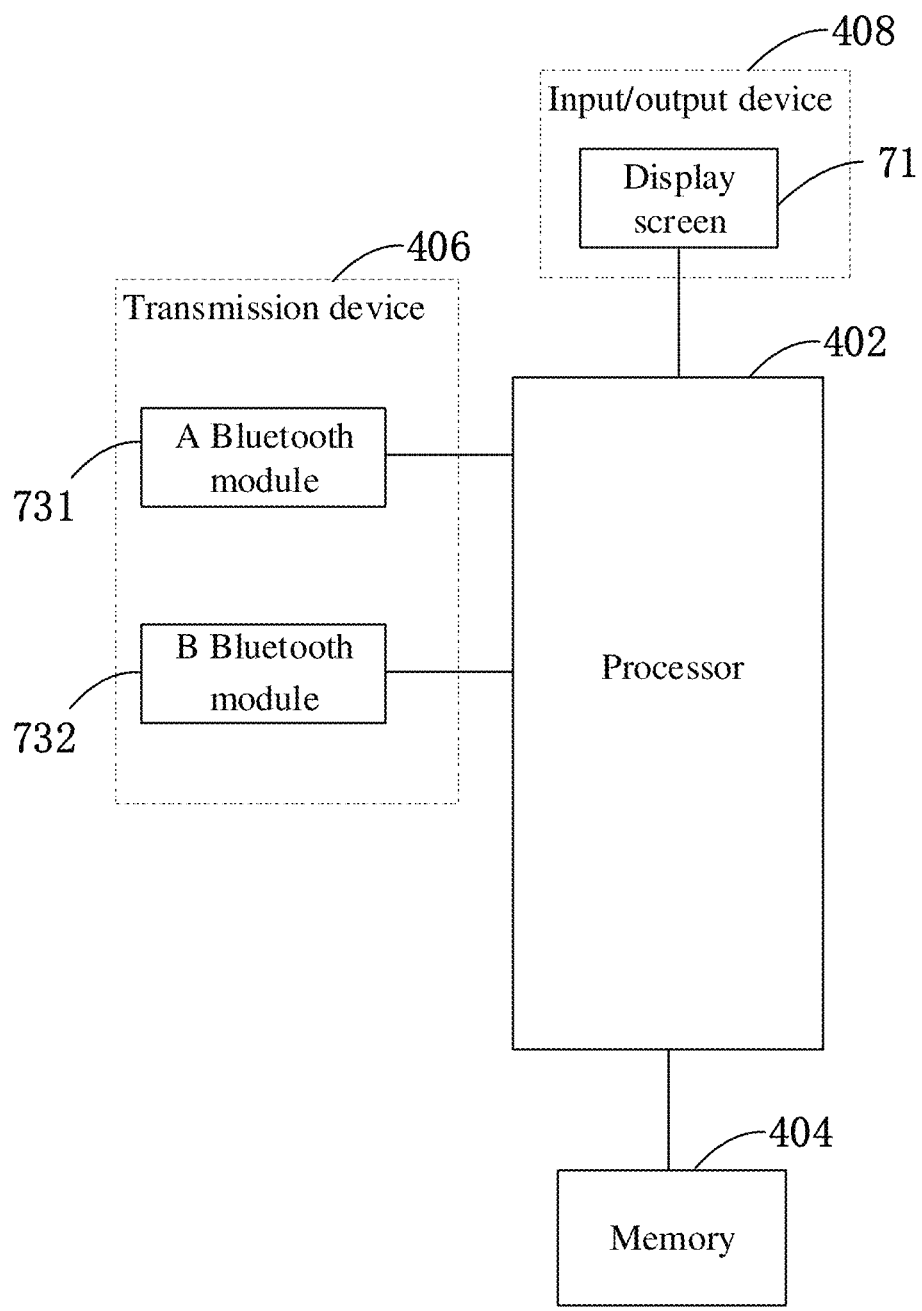
FIG. 4 is a block diagram of hardware structures of the centralized control system according to an embodiment of the invention.

FIG. 4 is a block diagram of hardware structures of the centralized control system according to an embodiment of the invention. As shown in FIG. 4, the centralized control system 70 may include one or more (only one is shown in FIG. 4) processors 402 and a memory 404 for storing data. The processors 402 may include, but not limited to, a processing device such as a microprocessor MCU or a programmable logic device FPGA, and the centralized control system 70 above may further include a transmission device 406 and an input/output device 408 for communication functions. Specifically, the transmission device 406 includes at least two Bluetooth modules, such as at least A Bluetooth module 731 and B Bluetooth module 732. The A Bluetooth module 731 is connectable with the Bluetooth module of the first wearable device 11 and the Bluetooth module of the second wearable device 12, and the B Bluetooth module 732 is connectable with the mobile terminal 13 with the Bluetooth communication function.

The transmission device 406 preferably also includes a network adapter (Network Interface Controller, NIC, not shown), which may be connected to other network devices through the base station so as to communicate with the Internet, such as communicating with the cloud server 14 to obtain music resources of the cloud server 14.

The input/output device 408 includes at least the display screen 71. In addition, the input/output device 408 may also include a speaker, a microphone, and the like. The display screen 71 may be used to display the running state (such as running speed, remaining power or remaining fuel, etc.) of the vehicle 100, and may also display multimedia information. The multimedia information displayed may include entertainment shortcut icons, entertainment status icons, lyrics subtitles, and the like. It will be understood by those skilled in the art that the hardware structure of the centralized control system shown in FIG. 4 is only for illustration, and does not limit the structure of the centralized control system 70 described above. For example, the centralized control system 70 may also include more or fewer components than those shown in FIG. 4, or have a different configuration than that shown in FIG. 4.

The memory 404 may be used to store computer programs, such as software programs and modules that perform certain functions of the centralized control system 70. The centralized control system 70 is not only capable of transmitting the audio signals between the first wearable device 11 and the second wearable device 12, but is preferable also capable of transmitting such audio signals to the computer programs. The preferred processor 402 can execute computer programs stored in the memory 404 to perform various functional applications and data processing, so that the interaction between the centralized control system 70 and the external devices 11, 12, 13, 14 is realized. The memory 404 may include high-speed random-access memory, and may also include non-volatile memory, such as one or more magnetic storage devices, flash memory, or other non-volatile solid-state memory. In some embodiments, the memory 404 may further include memory located remotely relative to the processor 402, and these remote memories may be connected to centralized control system 70 through networks. Examples of such networks include, but not limited to, Internet, local area networks (LAN), mobile communication networks, and combinations thereof.

Figure 5:
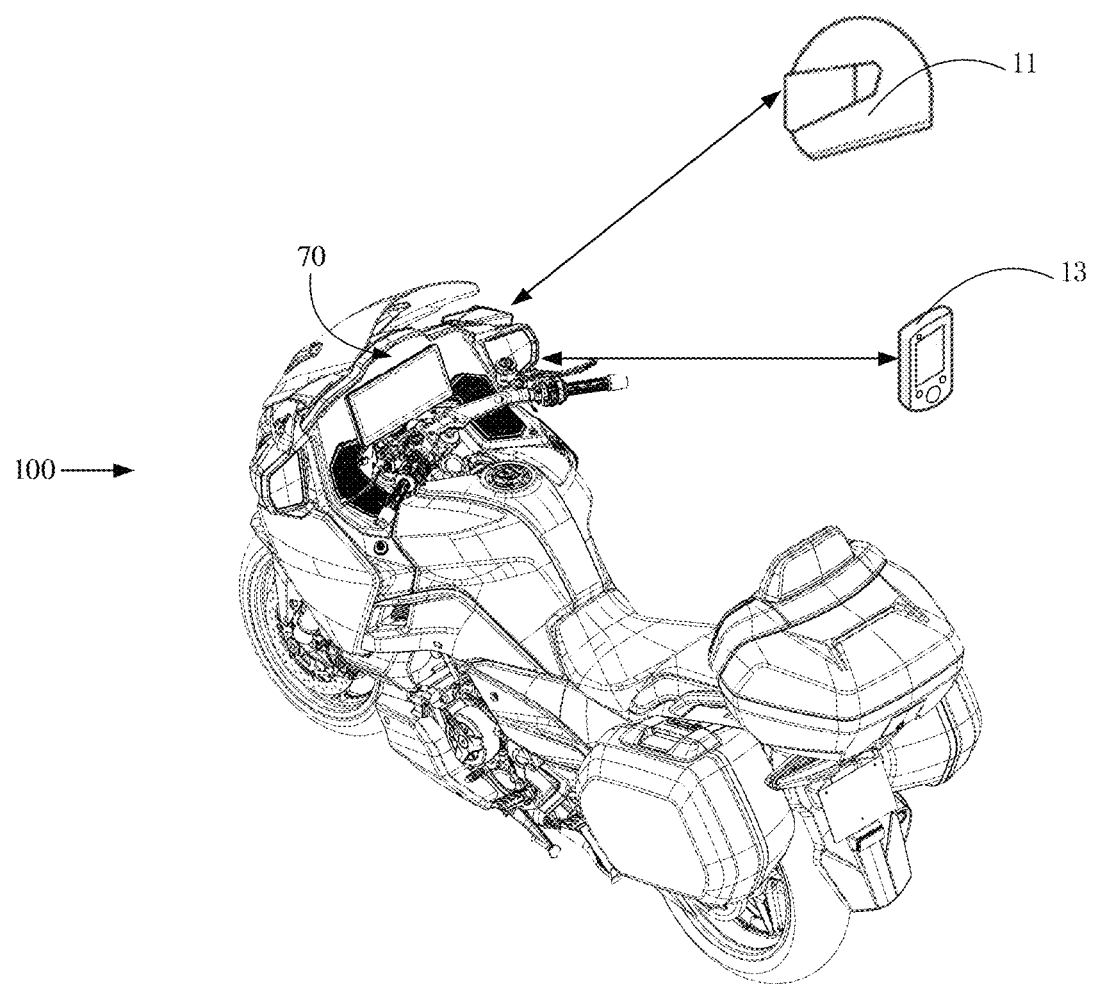
FIG. 5 is a schematic diagram of the interaction between the vehicle and a master device according to an embodiment of the invention.

FIG. 5 is a schematic diagram of the interaction between a vehicle and a master device. One of the first wearable device 11 and the second wearable device 12 can be set as a master device by the centralized control system 70. The centralized control system 70 may transmit the audio signals of a telephone call only to the master device (the first wearable device 11) when the audio signals of the call output from the mobile terminal 13 are received by the centralized control system 70. The centralized control system 70 may further separately inform the user of the master device that the mobile terminal 13 is ringing to initiate an incoming call.

The centralized control system 70 is capable of transmitting the audio signals of the call output from the mobile terminal 13 only to the master device when the call is connected by the mobile terminal 13, so that only the user of the master device is able to receive the audio signals of the call output from the mobile terminal 13 through the master device. In addition, the centralized control system 70 is capable of transmitting the audio signals acquired by the master device only to the mobile terminal 13. When the centralized control system 70 connects the telephone call between the mobile terminal 13 and the master device 11, the centralized control system 70 transmits the audio signals acquired by the master device 11 only to the mobile terminal 13 and not to the second wearable device 12, so that the privacy of the content of the call from the user of the master device 11 is guaranteed even when the centralized control system 70 is connected to the second wearable device 12.

The centralized control system 70 may be capable of providing exclusive functions for the user of the master device. For example, the centralized control system 70 may be able to allow the user of the master device 11 to either receive or initiate a phone call that either includes or excludes the second wearable device 12. As another example, the centralized control system 70 may be able to allow the user of the master device 11 to place a phone call on hold while the centralized control system 70 connects audio between the master device 11 and the second wearable device 12. As another example, the centralized control system 70 may be able to allow the user of the master device 11 to mute the microphone of the master device 11 and/or the microphone of the second wearable device 12.

In one embodiment, the centralized control system 70 analyzes and compares the audio signals acquired by the first wearable device 11 and/or the second wearable device 12 with predetermined audio commands, thereby determining an audio intention. The centralized control system 70 is capable of controlling certain functions of the vehicle 100 according to the audio intention, and/or the centralized control system 70 is capable of obtaining a query result corresponding to the audio intention from a cloud server 14 according to the audio intention and capable of converting the query result into audio fed to the first wearable device 11 and/or the second wearable device 12. With such an embodiment, the driver and/or the passenger are able to control certain vehicle functions or obtain information the cloud server 14 by speaking proper voice commands at any time during the running of the vehicle 100.

For example, the centralized control system 70 may have a wake word such as "Hello" to enable the voice command recognition function. The centralized control system 70 may be set so that only the master device is able to activate the voice command recognition function. In addition, the recognized commands in the voice command recognition feature of the centralized control system 70 may be set and changed by the user (the term "user" described herein may refer to the driver, or the passenger or other persons programming the centralized control system 70 according to their own habits, preferences, and the like, by touching the relevant operation icons on the display screen 71. Specifically, the audio intention may be "heating the handle or seats of the vehicle 100", "turning on or off navigation", "adjusting voice volume or brightness", a dialogue, or the like, wherein the dialogue may be similar to "how is the weather today". If the intention is "heating the handle or seats of the vehicle 100", "turning on or off navigation", "adjusting voice volume or brightness", or the like, the centralized control system 70 is capable of controlling the hardware or software on the vehicle 100 to perform related actions. If the intention is a dialogue, the centralized control system 70 is capable of acquiring the query result information corresponding to the audio intention from the cloud server 14 or locally and transmitting the query result information to the master device, so that the user of the master device is able to control the vehicle 100 by audio or acquire the information currently wanted to know by audio when the vehicle 100 is running.

In one embodiment, when the driver's mobile terminal 13 receives a phone call, the centralized control system 70 may receive an incoming ring signal from the mobile terminal and may transmit an audible call ringing signal to the speaker of the master device. At the same time, the centralized control system 70 may enter its voice command recognition mode even if the wake word has not been spoken. Then, in order to ensure driving safety and considering that the driver needs to hold the handlebar assembly 61 when the vehicle 100 is running, the driver may speak to control the mobile terminal 13 and reject or connect the call. The command instructions may be phrases such as "reject the call", "connect the call", or the like, so it is convenient and hands-free for the mobile terminal 13 connected to the centralized control system 70 to connect the call or reject the call in response to the instruction result. If the wake word is "hello", then speaking the wake word while the incoming call is ringing may cause the centralized control system 70 to instruct the mobile terminal 13 to connect the call and immediately thereafter transmit audio of "hello" to the mobile terminal 13 and to the calling party at the start of the connected call.

In another embodiment, the display screen 71 is a touch screen. When an incoming phone call is received by the mobile terminal 13, the control unit 72 of the centralized control system 70 is capable of controlling the display screen 71 to display a trigger area with buttons for connecting or rejecting the call. The control unit 72 is capable of determining the instruction result for the audio signals of the call according to pressure on the trigger area of the display screen 71, and capable of instructing the mobile terminal 13 to connect or reject the call.

In one embodiment, the centralized control system 70 enables the user of the master device to connect or reject the call by speaking, and also enables the user of the master device to connect or reject the call by sending a trigger instruction to the trigger area of the display screen 71 by means of touching, pressing, or the like.

In one embodiment, one or more buttons (not shown) on the handlebar assembly 61 is connected to the centralized control system 70. Pressing of the button(s) may cause the centralized control system 70 to instruct the mobile terminal 13 to connect the call or reject the call. Specifically, the centralized control system 70 may be connected to the button(s) provided on the handlebar assembly 61 through cables. In one embodiment, the centralized control system 70 can connect the call or reject the call by: a) audio function; b) sending a trigger command to the trigger area of the display screen 71 by means of touching or pressing the display screen 71 of the centralized control system 70; or c) touching or pressing the button provided on the handlebar assembly 61, so the driver may select the operation mode of connecting the call or rejecting the call according to the current driving situation of the vehicle 100.

FIG. 6 is a block diagram of structures of an information interaction system according to an embodiment of the invention. As shown in FIG. 6, the information interaction system includes a centralized control assembly 70, and the centralized control assembly 70 includes the control unit 72 and the display screen 71. The control unit 72 is used to control the display screen 71 to display the status information of the vehicle 100. The centralized control assembly 70 further includes at least one communication module 73. The information interaction system further includes the first wearable device 11 and the second wearable device 12. Each wearable device 11, 12 includes one communication module 112, 122 transmitting the signals with the centralized control assembly 70, one voice acquisition module 111, 121 and one voice output module 113, 123. For each wearable device 11, 12, the communication module 112, 122 is connected to the voice acquisition module 111, 121 and the voice output module 113, 123. The communication module 112, 122 is capable of transmitting the audio signals acquired by the voice acquisition module 111, 121 to the centralized control assembly 70, and is capable of receiving audio signals from the centralized control assembly for outputting on the voice output module 113, 123. The voice acquisition modules 111, 121 are preferably microphones, and the voice output modules 113, 123 are preferably speakers.

Figure 7:
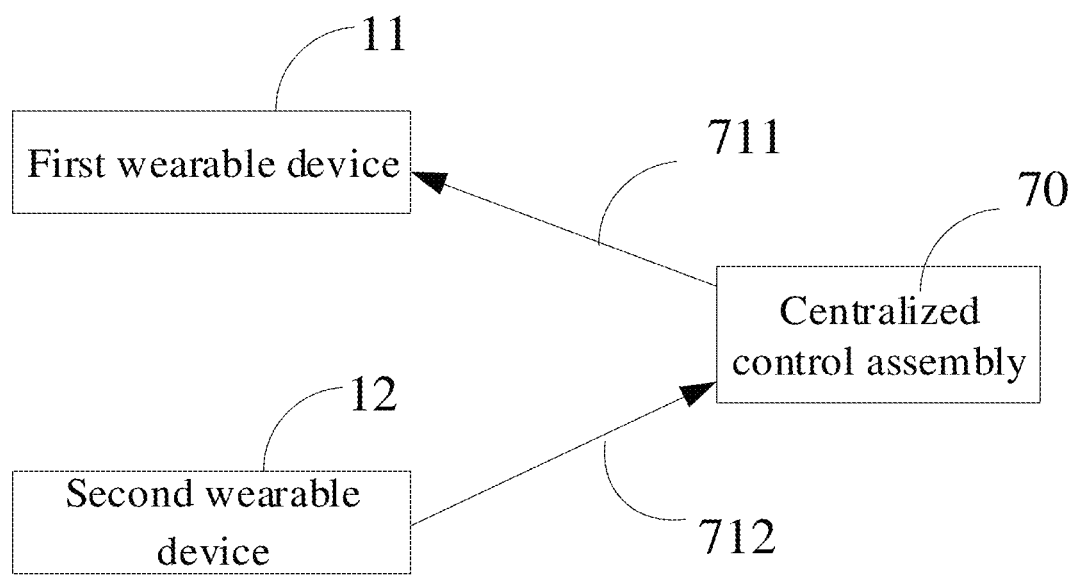
FIG. 7 is a schematic diagram of a transmission route of the information interaction system according to an embodiment of the invention.

FIG. 7 is a schematic diagram of a transmission route of an information interaction system according to an embodiment of the invention. As shown in FIG. 7, a first (preferably Bluetooth) transmission link 711 is established between the first wearable device 11 and the centralized control assembly 70, and a second (preferably Bluetooth) transmission link 712 is established between the second wearable device 12 and the centralized control assembly 70.

Preferably, the Bluetooth module of the centralized control assembly 70 searches for the Bluetooth modules of both the first wearable device 11 and the second wearable device 12, avoiding Bluetooth communication problems that might occur should the Bluetooth module of the first wearable device 11 become paired and directly connected with the Bluetooth module of the second wearable device 12. The centralized control assembly 70 may search for the first wearable device 11 and the second wearable device 12 in sequence, and may establish connections with them in sequence by touching the display screen 71 by the user (the term "user" described herein may refer to the driver, or the passenger or other persons) when the centralized control assembly 70 is to establish connections with the first wearable device 11 and the second wearable device 12 for the first time. After a first pairing and connection, the centralized control assembly 70 will automatically search for the first wearable device 11 and the second wearable device 12 each time the vehicle 100 is started.

Figure 8:
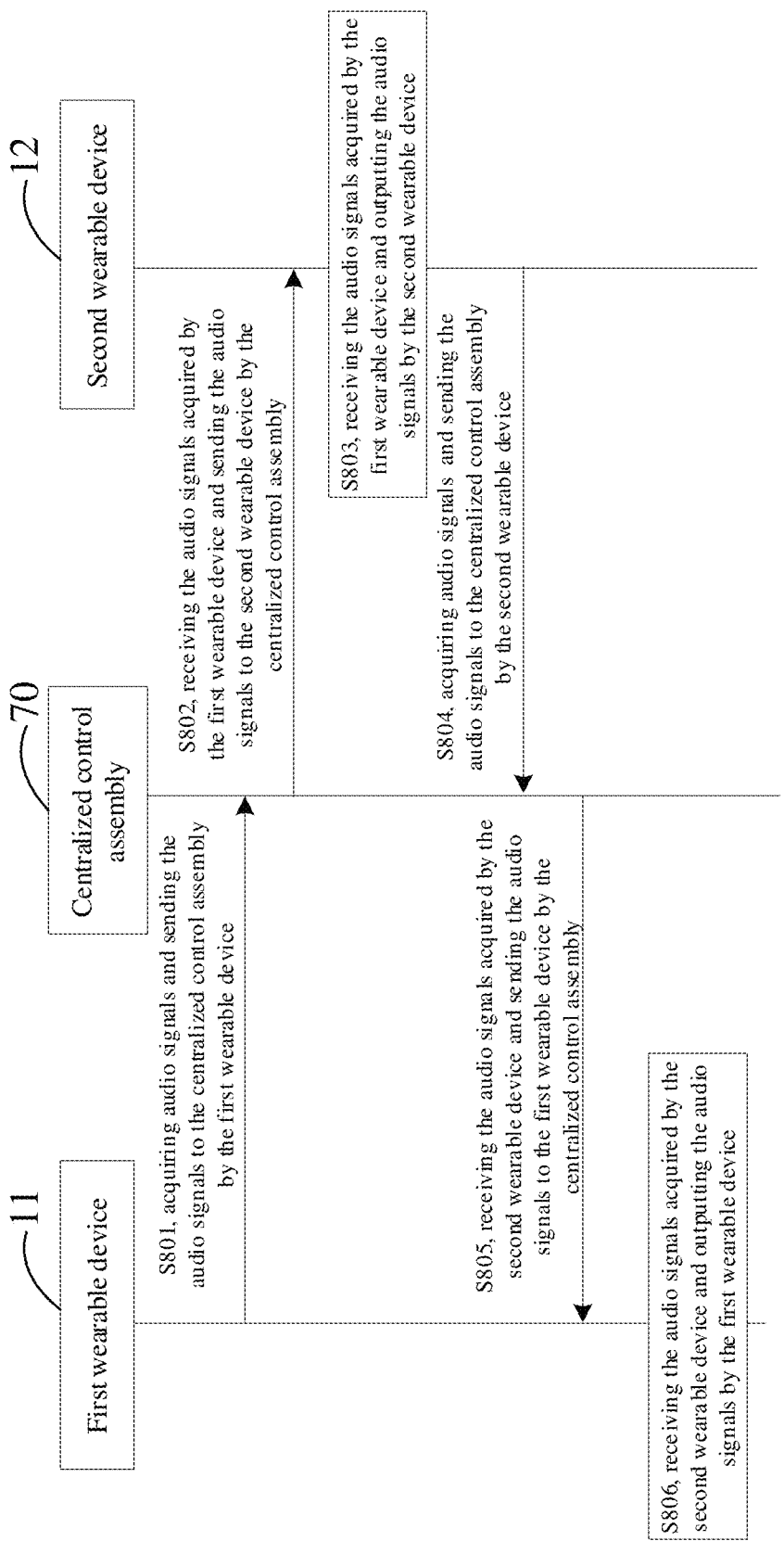
FIG. 8 is a flowchart of communication between a first wearable device and a second wearable device according to an embodiment of the present invention.

FIG. 8 is a flowchart of communication between a first wearable device and a second wearable device according to an embodiment of the present invention. As shown in FIG. 8, the communication between the first wearable device 11 and the second wearable device 12 includes the following steps:

S801, acquiring audio signals and sending the audio signals to the centralized control assembly 70 by the first wearable device 11;

S802, receiving the audio signals acquired by the first wearable device 11 and sending the audio signals to the second wearable device 12 through the centralized control assembly 70;

S803, receiving the audio signals acquired by the first wearable device 11 and outputting the audio signals by the second wearable device 12;

S804, acquiring audio signals and sending the audio signals to the centralized control assembly 70 by the second wearable device 12;

S805, receiving the audio signals acquired by the second wearable device 12 and sending the audio signals to the first wearable device 11 though the centralized control assembly 70; and S806, receiving the audio signals acquired by the second wearable device 12 and outputting the audio signals by the first wearable device 11.

In one embodiment, the centralized control assembly 70 includes at least two Bluetooth modules, one dedicated for communication with the first wearable device 11 and one dedicated for communication with the second wearable device 12. In another embodiment. The centralized control assembly 70 includes three Bluetooth modules, with the third Bluetooth module dedicated for communication with the mobile terminal 13.

An example of the operation of switching the various modes of the information interaction system is illustrated below.

Scenario 1: the user of the first wearable device 11 and the user of the second wearable device 12 are communicating through the first wearable device 11 and the second wearable device 12. At this time, if the mobile terminal 13 of the user of the master device (the first wearable device 11) is called, the centralized control assembly 70 is able to receive an incoming ringing signal from the mobile terminal 13, and the information interaction system is able to switch from the current communication mode between the first wearable device 11 and the second wearable device 12 to an incoming call instruction mode. In the incoming call instruction mode, the centralized control assembly 70 transmits audible incoming call ringing signals to the master device, and the centralized control assembly 70 receives and is capable of recognizing the audio signals acquired by the voice acquisition module of the master device, so as to determine the instruction result for the call and to transmit the instruction result to the mobile terminal 13, wherein the instruction result instructs the mobile terminal 13 to either connect the call or reject the call.

If the instruction result instructs the mobile terminal 13 to connect the call, then the information interaction system switches to a call mode. The centralized control assembly 70 is capable of transmitting the audio signals of the call output from the mobile terminal 13 only to the master device, and the centralized control assembly 70 is capable of transmitting the audio signals acquired by the audio acquisition module of the master device only to the mobile terminal 13.

Scenario 2: the user of the master device (one of the wearable device 11 and the second wearable device 12) decides to activate on-line audio mode of the information interaction system, and speaks the appropriate wake term to enable the voice command recognition function followed by the desired command. When the audio signals acquired by the master device are matched with the preset voice commands terms by the centralized control assembly 70, the information interaction system switches to on-line audio mode and determines the audio intention. The centralized control assembly 70 is capable of controlling the vehicle 100 according to the audio intention, or the centralized control assembly 70 is capable of obtaining a query result corresponding to the audio intention from a cloud server 14, is capable of converting the query result into audio signals of the query result and is capable of transmitting the audio signals of the query result to the master device.

It should be noted that the specific scenarios described here are only used to explain the switching of various modes of the information interaction system, but not to limit the invention. The switching of the specific modes of the information interaction system described here is just an example, and the mode switching of the information interaction system is not limited to the above two scenarios.

It should be understood that the specific embodiments described herein are used to illustrate this invention, not to limit the invention. Understanding the embodiments provided in the present specification, all other embodiments which can be devised by those skilled in the art without creative work fall within the scope of the present invention.

The drawings are only some examples or embodiments of the present invention, and for those skilled in the art, the present invention may also be applied to other similar situations according to these drawings without requiring creative work. In addition, it may be understood that although the work done in this development process may be complex and lengthy, for those skilled in the art, modifications on certain designs, manufactures and productions based on the technical content disclosed in this specification are only conventional technical means, and should not be regarded as insufficient content disclosed in this specification.

The term "embodiment" used in this specification means that particular features, structures, or characteristics described in connection with the embodiment may be included in at least one embodiment of the invention. The appearance of the phrase in various places in the specification does not necessarily mean the same embodiment, nor does it mean that it is mutually exclusive or alternative to other embodiments. It will be clearly or implicitly understood by those skilled in the art that certain features of the embodiments described in this specification may be combined with certain features of other embodiments without conflict.

The above-mentioned embodiments only represent several embodiments of the present invention, and the descriptions thereof are relatively specific and detailed, but should not be construed as a limitation to the scope. It should be noted that for those skilled in the art, without departing from the concept of the present invention, several modifications and improvements may be made, which all belong to the scope of the present invention. Therefore, the scope of the present invention should be determined by the appended claims.

The invention claimed is:

1. A vehicle, being a motorcycle or an all-terrain vehicle, the vehicle comprising:
 a frame;
 a plurality of wheels comprising at least one front wheel and at least one rear wheel;
 a suspension system comprising a front suspension and a rear suspension, the at least one front wheel being connected to the frame through the front suspension, and the at least one rear wheel being connected to the frame through the rear suspension;
 a power system disposed on the frame for providing power to the vehicle, at least one of the front wheel and the rear wheel being connected to the power system;
 a plurality of seats disposed on the frame, the plurality of seats comprising a driver's seat and at least one passenger's seat; and
 a centralized control system comprising a control unit and a display screen, the control unit being used to control the display screen to display the status information of the vehicle, the centralized control system comprising at least one communication module, and the centralized control system being capable of transmitting signals with a first wearable device and a second wearable device through the communication module;
 wherein, when a user of the first wearable device is on the driver's seat and a user of the second wearable device is on the passenger's seat, the centralized control system is capable of transmitting audio signals acquired by the first wearable device to the second wearable device and is capable of transmitting audio signals acquired by the second wearable device to the first wearable device through the communication module, so that the user of the first wearable device and the user of the second wearable device are able to speak with each other through the first wearable device and the second wearable device; and
 wherein the communication module of the centralized control system is connected to the first wearable device and the second wearable device through short distance wireless communication selected from the group consisting of: Bluetooth communication, ZigBee communication, Wi-Fi communication, UWB communication, Radio frequency communication, and Infrared communication.

2. The vehicle of claim 1, wherein each of the centralized control system, the first wearable device, and the second wearable device comprises at least one Bluetooth module, wherein the Bluetooth module of the centralized control system is able to be paired and connected with the Bluetooth module of the first wearable device and the Bluetooth module of the second wearable device, and wherein the Bluetooth module of the centralized control system is able to establish a Bluetooth transmission link with the Bluetooth module of the first wearable device and the Bluetooth module of the second wearable device.

3. The vehicle of claim 2, wherein the Bluetooth module of the centralized control system searches for the Bluetooth module of the first wearable device and the Bluetooth module of the second wearable device when the Bluetooth module of the centralized control system is to be paired and connected with the Bluetooth module of the first wearable device and the Bluetooth module of the second wearable device.

4. The vehicle of claim 2, wherein the centralized control system comprises at least a second Bluetooth module for connecting to a Bluetooth module of a mobile terminal, and wherein the centralized control system is capable of transmitting local audio signals of the mobile terminal and the audio signals acquired by the mobile terminal from a cloud server to the first wearable device and the second wearable device when the centralized control system is connected to the mobile terminal.

5. The vehicle of claim 4, wherein one of the first wearable device and the second wearable device is set as a master device by the centralized control system, and the centralized control system is capable of transmitting audio signals of a telephone call only to the master device when the audio signals of the call output from the mobile terminal are received by the centralized control system, wherein the centralized control system is capable of transmitting the audio signals acquired by the master device only to the mobile terminal while the call is in process.

6. The vehicle of claim 5, wherein the centralized control system is capable of recognizing the audio signals acquired by the master device so as to determine an instruction result, and is capable of transmitting the instruction result to the mobile terminal, wherein the instruction result instructs the mobile terminal to either connect an incoming call or reject the incoming call.

7. The vehicle of claim 5, wherein the display screen is capable of displaying trigger areas for connecting an incoming call of the mobile terminal and rejecting the incoming call of the mobile terminal, wherein the control unit is capable of determining an instruction result for the audio signals of the call according to which trigger area is pressed and is capable of transmitting the instruction result to the mobile terminal, and wherein the instruction result instructs the mobile terminal to either connect the incoming call or reject the incoming call.

8. The vehicle of claim 5,
wherein the vehicle further comprises a manipulation system for manipulating the running of the vehicle, with the manipulation system having a handlebar assembly located above the front wheel and in front of the seats, with a button on the handlebar assembly connected to the centralized control system;
wherein, when the mobile terminal informs the centralized control system of an incoming call, the button is capable of transmitting a control command to the centralized control system in response to an external force, wherein the control unit is capable of determining the instruction result for the audio signals of the call according to the control command from the button, and wherein the instruction result instructs the mobile terminal to either connect the incoming call or reject the incoming call.

9. The vehicle of claim 5, wherein the centralized control system is capable of recognizing audio signals acquired by the master device to determine audio intention, and is capable of controlling the vehicle according to the audio intention, and the centralized control system is capable of obtaining a query result corresponding to the audio intention from a cloud server, is capable of converting the query result into result audio signals and is capable of transmitting the result audio signals to the master device.

10. An information interaction system of a vehicle, the vehicle being a motorcycle or an
all-terrain vehicle, the information interaction system of the vehicle comprising:
a centralized control assembly comprising a control unit and a display screen, wherein the control unit is used to control the display screen to display status information of the vehicle, and the centralized control assembly further comprises at least one communication module;
a first wearable device capable of transmitting audio voice signals with the communication module of the centralized control assembly; and
a second wearable device capable of transmitting audio voice signals with the communication module of the centralized control assembly;
wherein the centralized control assembly is capable of transmitting audio signals acquired by the first wearable device to the second wearable device and is capable of transmitting audio signals acquired by the second wearable device to the first wearable device, so that the user of the first wearable device and the user of the second wearable device are able to speak with each other through the first wearable device and the second wearable device;
wherein both the first wearable device and the second wearable device can transmit voice audio with the communication module of the centralized control assembly through short distance wireless communication selected from the group consisting of: Bluetooth communication, ZigBee communication, Wi-Fi communication, UWB communication, Radio frequency communication, and Infrared communication.

11. The information interaction system of the vehicle according to claim 10, wherein each of the centralized control assembly, the first wearable device, and the second wearable device comprises at least one Bluetooth module, wherein the Bluetooth module of the centralized control assembly is able to be paired and connected with the Bluetooth module of the first wearable device and the Bluetooth module of the second wearable device, and wherein the Bluetooth module of the centralized control assembly is able to establish a Bluetooth transmission link with the Bluetooth module of the first wearable device and the Bluetooth module of the second wearable device.

12. The information interaction system of the vehicle according to claim 11, wherein the first wearable device is a helmet and the second wearable device is a helmet.

13. The information interaction system of the vehicle of claim 10, wherein the Bluetooth module of the centralized control assembly searches for the Bluetooth module of the first wearable device and the Bluetooth module of the second wearable device when the Bluetooth module of the centralized control assembly is to be paired and connected with the Bluetooth module of the first wearable device and the Bluetooth module of the second wearable device.

14. The information interaction system of the vehicle of claim 13, wherein one of the first wearable device and the second wearable device is set as a master device by the centralized control assembly, and wherein, when the mobile terminal informs the centralized control assembly of an incoming call, the centralized control assembly is capable of transmitting an audible incoming call ringing signal only to the master device.

15. The information interaction system of the vehicle of claim 14, wherein the centralized control assembly is capable of recognizing the audio signals acquired by the master device so as to determine an instruction result, and is capable of transmitting the instruction result to the mobile terminal, wherein the instruction result instructs the mobile terminal to either connect an incoming call or reject the incoming call.

16. The information interaction system of the vehicle of claim 14, wherein the display screen is capable of displaying trigger areas for connecting an incoming call of the mobile terminal and rejecting the incoming call of the mobile terminal, wherein the control unit is capable of determining an instruction result for the audio signals of the call according to which trigger area is pressed and is capable of transmitting the instruction result to the mobile terminal, and wherein the instruction result instructs the mobile terminal to either connect the incoming call or reject the incoming call.

17. The information interaction system of the vehicle according to claim 16, wherein the centralized control assembly is capable of transmitting audio signals of a telephone call only to the master device when the audio signals of the call output from the mobile terminal are received by the centralized control assembly, and wherein the centralized control assembly is capable of transmitting the audio signals acquired by the master device only to the mobile terminal while the call is in process.

18. The information interaction system of the vehicle of claim 14, further comprising a button connected to the centralized control assembly, wherein, when the mobile terminal informs the centralized control assembly of an incoming call, the button is capable of transmitting a control command to the centralized control assembly in response to an external force, wherein the control unit is capable of determining the instruction result for the audio signals of the call according to the control command from the button, and wherein the instruction result instructs the mobile terminal to either connect the incoming call or reject the incoming call.

19. The information interaction system of the vehicle of claim 14, wherein the centralized control assembly is capable of recognizing audio signals acquired by the master device to determine audio intention, and is capable of controlling the vehicle according to the audio intention, and the centralized control assembly is capable of obtaining a query result corresponding to the audio intention from a cloud server, is capable of converting the query result into result audio signals and is capable of transmitting the result audio signals to the master device.

20. The information interaction system of the vehicle according to claim 10, wherein the centralized control assembly comprises at least a second Bluetooth module for connecting to a Bluetooth module of a mobile terminal, and wherein the centralized control assembly is capable of transmitting local audio signals of the mobile terminal and the audio signals acquired by the mobile terminal from a cloud server to the first wearable device and the second wearable device when the centralized control assembly is connected to the mobile terminal.

* * * * *